United States Patent
O'Malley et al.

(10) Patent No.: US 8,234,696 B2
(45) Date of Patent: Jul. 31, 2012

(54) METHOD AND SYSTEM FOR PROVIDING A ONE TIME PASSWORD TO WORK IN CONJUNCTION WITH A BROWSER

(75) Inventors: Michael O'Malley, Lowell, MA (US); Gideon Ansell, Boston, MA (US); Andrea Doherty, Cambridge, MA (US); Aaron Kechley, Cambridge, MA (US); Andrew Nanopoulos, Wakefield, MA (US)

(73) Assignee: EMC Corporation, Hopkinton, MA (US)

( * ) Notice: Subject to any disclaimer, the term of this patent is extended or adjusted under 35 U.S.C. 154(b) by 1532 days.

(21) Appl. No.: 11/705,553

(22) Filed: Feb. 12, 2007

(65) Prior Publication Data
US 2008/0028447 A1    Jan. 31, 2008

Related U.S. Application Data

(60) Provisional application No. 60/772,351, filed on Feb. 10, 2006.

(51) Int. Cl.
G06F 7/04 (2006.01)
G06F 21/00 (2006.01)

(52) U.S. Cl. .......................... 726/6; 713/182
(58) Field of Classification Search .................. None
See application file for complete search history.

(56) References Cited

U.S. PATENT DOCUMENTS

| | | | |
|---|---|---|---|
| 6,085,320 A | 7/2000 | Kaliski | |
| 6,189,098 B1 | 2/2001 | Kaliski | |
| 6,240,184 B1 | 5/2001 | Huynh et al. | |
| 6,446,052 B1 | 9/2002 | Juels | |
| 6,460,141 B1 | 10/2002 | Olden | |
| 6,910,041 B2 * | 6/2005 | Exton et al. | 1/1 |
| 6,970,070 B2 | 11/2005 | Juels et al. | |
| 6,985,583 B1 | 1/2006 | Brainard et al. | |
| 7,100,049 B2 | 8/2006 | Gasparini et al. | |

(Continued)

FOREIGN PATENT DOCUMENTS

WO    WO-2006/014358 A1    2/2006

(Continued)

OTHER PUBLICATIONS

RSA securities "Enhancing One-Time Passwords for Protection Against Real-Time Phishing Attacks", 2004. RSA Security Inc. pp. 1-10.*

(Continued)

*Primary Examiner* — Nathan Flynn
*Assistant Examiner* — Abdullah Almamun
(74) *Attorney, Agent, or Firm* — BainwoodHuang

(57) ABSTRACT

A method of submitting information as part of an authentication operation includes generating a one time password that is intended for use in an authentication operation. The method further includes providing the one time password in a display field, wherein the display field is adapted to work in conjunction with a browser to submit the one time password in response to a request for the one time password. A method of controlling submission of identity information within an authentication system includes receiving a trust list from the authentication system. The trust list identifies entities that are authorized to receive the identity information. The method further includes receiving a request to submit the identity information to a candidate entity for an authentication operation, and providing the identity information to the candidate entity if the trust list indicates that the candidate entity is authorized to receive the identity information.

61 Claims, 4 Drawing Sheets

U.S. PATENT DOCUMENTS

| | | | |
|---|---|---|---|
| 7,111,172 B1 | 9/2006 | Duane et al. | |
| 7,197,639 B1 | 3/2007 | Juels et al. | |
| 7,219,368 B2 | 5/2007 | Juels et al. | |
| 7,346,775 B2 | 3/2008 | Gasparinl et al. | |
| 7,359,507 B2 | 4/2008 | Kaliski | |
| 7,363,494 B2 | 4/2008 | Brainard et al. | |
| 7,380,271 B2* | 5/2008 | Moran et al. | 726/4 |
| 7,404,087 B2 | 7/2008 | Teunen | |
| 7,836,306 B2* | 11/2010 | Pyle et al. | 713/169 |
| 2002/0046189 A1* | 4/2002 | Morita et al. | 705/67 |
| 2002/0159601 A1* | 10/2002 | Bushmitch et al. | 380/277 |
| 2003/0135740 A1* | 7/2003 | Talmor et al. | 713/186 |
| 2004/0172535 A1 | 9/2004 | Jakobsson et al. | |
| 2006/0031174 A1* | 2/2006 | Steinmetz | 705/67 |
| 2006/0037073 A1 | 2/2006 | Juels et al. | |
| 2006/0041759 A1 | 2/2006 | Kaliski et al. | |
| 2006/0106606 A1* | 5/2006 | Labaton | 704/250 |
| 2006/0174104 A1 | 8/2006 | Crichton et al. | |
| 2006/0227378 A1* | 10/2006 | Mihira | 358/1.16 |
| 2006/0294023 A1* | 12/2006 | Lu | 705/67 |
| 2007/0011724 A1* | 1/2007 | Gonzalez et al. | 726/4 |
| 2007/0067828 A1* | 3/2007 | Bychkov | 726/3 |
| 2007/0124321 A1 | 5/2007 | Szydlo | |
| 2007/0130472 A1* | 6/2007 | Buer et al. | 713/182 |
| 2007/0174614 A1 | 7/2007 | Duane et al. | |
| 2007/0179842 A1* | 8/2007 | Chen | 705/14 |
| 2007/0256123 A1 | 11/2007 | Duane et al. | |
| 2008/0028447 A1 | 1/2008 | O'Malley et al. | |
| 2008/0036572 A1* | 2/2008 | Muller | 340/5.82 |
| 2010/0205451 A1* | 8/2010 | Cannon et al. | 713/185 |

FOREIGN PATENT DOCUMENTS

WO    WO 2006/014358 A1 *    2/2006

OTHER PUBLICATIONS

International Search Report for PCT/US07/003856, mailed Sep. 11, 2007. (3 Pages).

* cited by examiner

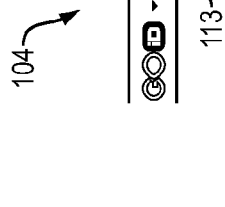
FIG. 4A
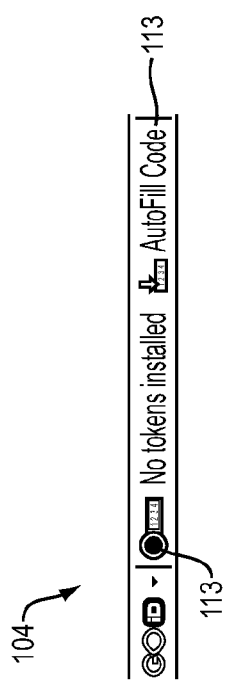
FIG. 4B
FIG. 4C
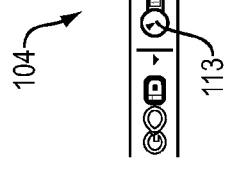
FIG. 4D
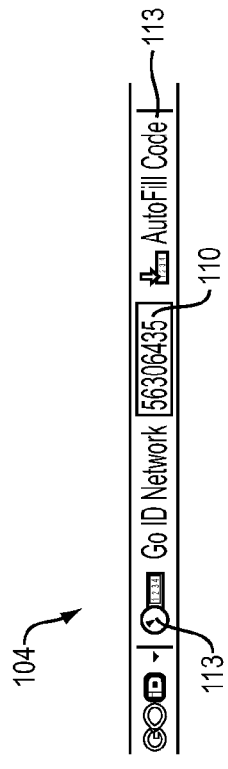
FIG. 4E
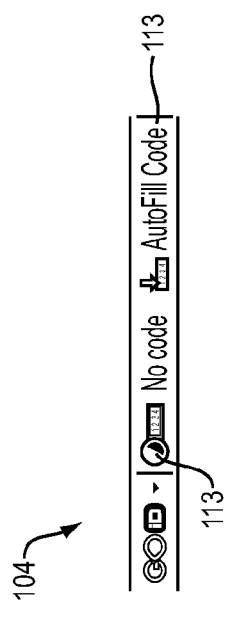
FIG. 4F
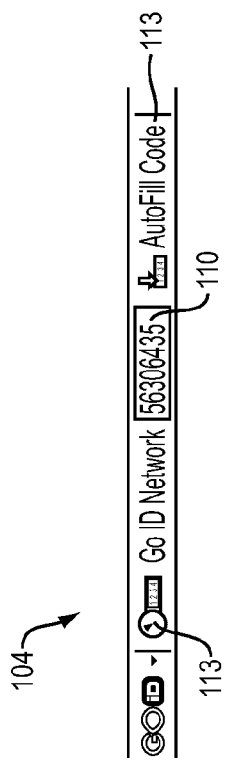

METHOD AND SYSTEM FOR PROVIDING A ONE TIME PASSWORD TO WORK IN CONJUNCTION WITH A BROWSER

CROSS REFERENCE TO RELATED APPLICATIONS

This application claims benefit of the following Patent Applications: U.S. Provisional Patent Application Ser. No. 60/772,351, filed Feb. 10, 2006.

BACKGROUND OF THE INVENTION

The invention relates generally to systems and methods for authenticating a user, and more specifically, to a system and method for authenticating a user utilizing a web browser toolbar one time password (OTP) token. The invention also relates to a system and method for preventing the OTP values (time based, counter based, event-based, challenge-response or other forms of one time passwords) from being submitted to a non-trusted web site.

Many institutions provide some form of Internet access for their customers. Online banking and online shopping are well-known examples, although there are many other models for using Internet access as part of overall client interaction. To provide such access an institution typically creates an account for the customer, and gives the customer a username and static password associated with the account.

Static passwords have some security weaknesses. For example, if a static password is compromised it remains compromised, because by definition it does not change. Dynamic passwords (for example OTPs and passwords that are provided on behalf of the user by either a hardware or software device) may be used to mitigate the problems associated with a static password. Since dynamic passwords are designed to change, a compromise only lasts for a finite time, i.e., until the dynamic password is updated.

Discrete devices and software modules exist to generate and display dynamic passwords such as OTPs. However, such devices and software modules typically require significant user assistance to submit the OTP to an entity requesting the OTP for an authentication operation. Further, such devices or software modules do not afford any safeguards against submitting the dynamic password to an unauthorized recipient.

SUMMARY OF THE INVENTION

As described herein, a user attempting to access an institution's website may be required to submit some sort of identity information or credential such as an OTP for authentication purposes. As used herein, a "credential" is any information that identifies a user. Examples of credentials include, but are not limited to, keys (secret or public), seeds, passcodes, tokencodes, passwords, OTPs, PINs (personal identification numbers), and biometrics.

Some of the described embodiments integrate a software version of an OTP (or other credential) generator within the browser that the customer is using to access the institution's website. Browser manufacturers provide third-party software developers a method to extend the functionality of the browser. This browser extension technology can be utilized to create a toolbar that generates OTPs. A user then uses these OTPs on an institution's logon page to gain access to the website.

In one embodiment the OTP toolbar token uses trust lists associated with each OTP generator (token), in order to prevent the user from being deceived into entering an OTP on an unauthorized website. The OTP toolbar token uses the trust lists to determine whether or not the user has visited a website on which it is permissible to display an OTP. The OTP toolbar token also uses the trust lists to automatically select which token is associated with a particular site. When a user is on a trusted website, the appropriate token is automatically selected and the password displayed to the user. Also, the underlying software libraries that the toolbar uses to obtain OTPs for display use the trust list and current URL from the browser to determine if the calling application will be allowed to obtain an OTP as well.

In one aspect, the invention is a method of submitting information as part of an authentication operation. The method includes generating a one time password that is intended for use in an authentication operation. The method further includes providing the one time password in a display field, wherein the display field is adapted to work in conjunction with a browser to submit the one time password in response to a request for the one time password.

One embodiment further includes submitting the one time password in response to the request without user intervention. Another embodiment further includes submitting the one time password in response to the request only if a user provides authorization to submit the one time password. Another embodiment further includes combining a token code and a PIN to generate the one time password.

In some embodiments, the method combines a token code and a biometric to generate the one time password. In another embodiment, the method combines the token code, the biometric and the PIN to generate the one time password.

In some embodiments, the display field is contained in a browser control. The browser control may be an applet, or it may be an ActiveX control, or other controls such as these known in the art.

The one time password may be generated so as to vary as a function of time, so that it changes or is updated every particular number of seconds, minutes, days, or other time increment. In other embodiments, the one time password may be generated so as to vary as a function of a sequence of events, for example changing each time a user activates a button or switch. In other embodiments, the one time password may be generated to vary on a challenge/response basis, such that the one time password varies dependent on information contained within a challenge. Or, the one time password may vary as some combination of these bases.

In one embodiment, the method includes preventing the display field and the browser from submitting the one time password if a trust list indicates that the one time password should not be submitted. The trust list includes entities, such as websites, that the authentication system deems to be authorized to receive the one time password.

In another aspect, an apparatus for submitting information as part of an authentication operation includes a password generator for generating a one time password that is intended for use in an authentication operation. The apparatus further includes a display generator for providing the one time password in a display field. The display field is adapted to work in conjunction with a browser to submit the one time password in response to a request for the one time password.

The embodiments described above for the method of submitting information as part of an authentication operation also apply to this apparatus.

In another aspect, a method of controlling submission of identity information within an authentication system includes receiving a trust list from the authentication system. The trust list identifies entities that are authorized to receive the identity information. The method further includes receiving a request to submit the identity information to a candidate entity for an authentication operation, and providing the identity information to the candidate entity if the trust list indicates that the candidate entity is authorized to receive the identity information.

In one embodiment, credentials are provided as the identity information. In another embodiment, a one time password is provided as the identity information. In various embodiments, the one time password is (i) a combination of a PIN and a token code, or (ii) a combination of a token code and a biometric, or (iii) a combination of the token code, the biometric and the PIN, or other combinations of specific credentials.

Another embodiment includes a trust list that identifies websites as entities that are authorized to receive the identity information. One embodiment includes a trust list that identifies desktop applications as entities that are authorized to receive the identity information. Or the trust list could be a combination thereof. In one embodiment the trust list is received by communicating with a server on the authentication system.

In one embodiment, a display field is provided for displaying the identity information. The display field may display a bland field if the trust list indicates that the candidate entity is not authorized to receive the identity information. Alternatively, the display field may display a diagnostic message (for example, "no code" or "website not authorized") if the trust list indicates that the candidate entity is not authorized to receive the identity information.

In another aspect, an apparatus for controlling submission of identity information within an authentication system includes a receiver for (i) receiving a trust list from the authentication system, wherein the trust list identifies entities that are authorized to receive the identity information, and (ii) receiving a request to submit the identity information to a candidate entity for an authentication operation. The apparatus further includes a processor for providing the identity information to the candidate entity if the trust list indicates that the candidate entity is authorized to receive the identity information.

The embodiments described above for the method of controlling submission of identity information within an authentication system includes receiving a trust list from the authentication system also apply to this apparatus.

In another aspect, a method of providing and controlling submission of information within an authentication system includes generating a one time password that is intended for use in an authentication operation. The method further includes providing the one time password in a display field. The display field is adapted to work in conjunction with a browser to submit the one time password in response to a request for the one time password. The method further includes receiving a trust list from the authentication system. The trust list identifies entities that are authorized to receive the one time password. The method also includes receiving a request to submit the one time password to a candidate entity for the authentication operation, and providing the one time password to the candidate entity if the trust list indicates that the candidate entity is authorized to receive the one time password.

BRIEF DESCRIPTION OF DRAWINGS

The foregoing and other objects of this invention, the various features thereof, as well as the invention itself, may be more fully understood from the following description, when read together with the accompanying drawings in which:

FIGS. 4A through 4F show various states of the token toolbar of FIGS. 1 and 2.

DESCRIPTION OF THE PREFERRED EMBODIMENTS

Figure 1:
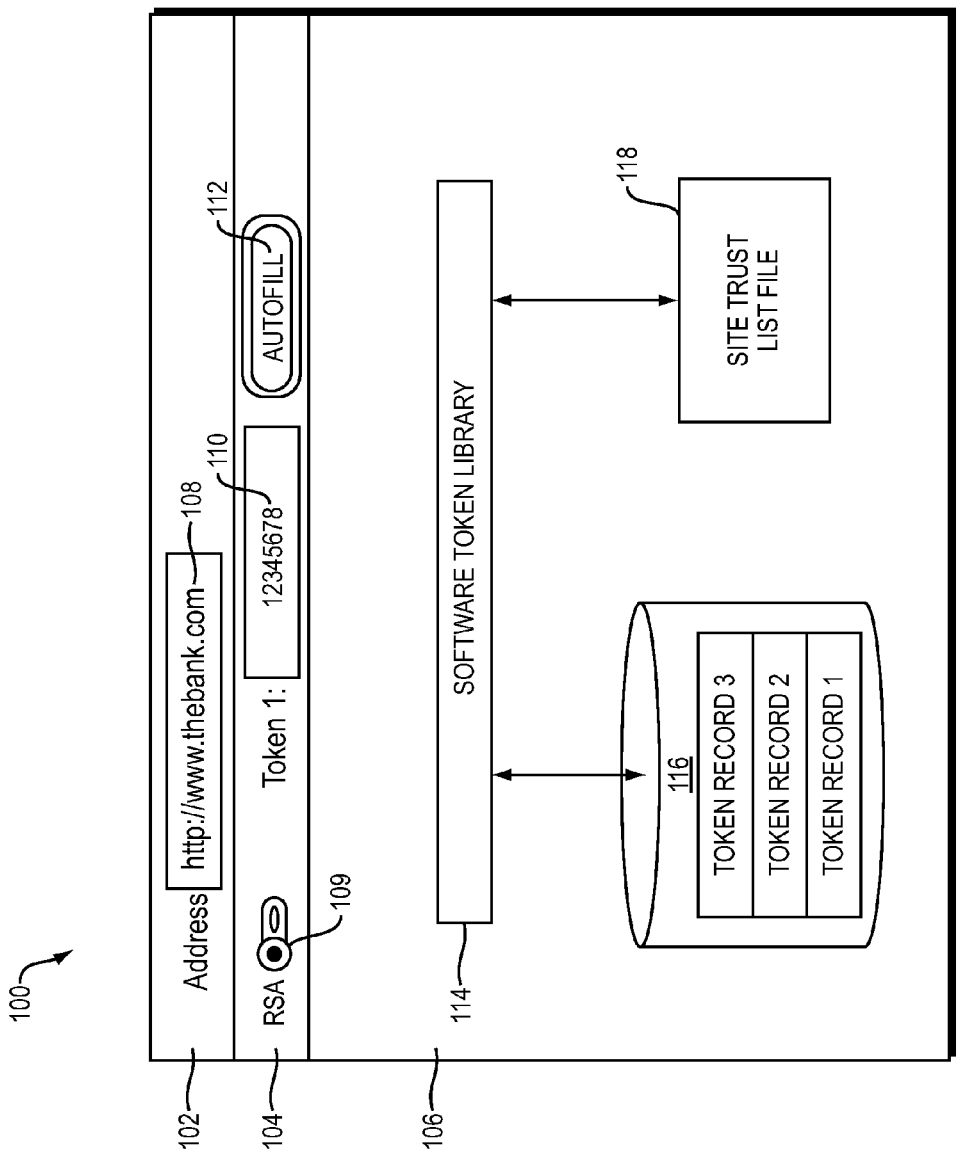
FIG. 1 illustrates one embodiment of an OTP in a browser toolbar.

Some of the described embodiments include a system and method for conveniently and efficiently providing identity information (such as an OTP) to a requesting entity (such as a website). Some of the described embodiments include a system and method for selectively providing the identity information to the requesting entity, depending on whether the requesting entity is authorized to receive the information.

The embodiments described herein may be implemented in various ways. Some of the embodiments describe a software implementation of a web browser and toolbar running on a personal computer, however other software implementations on different hardware platforms are also possible. For example, the described embodiments could also be implemented on handheld wireless processing and communication device, or a more centralized computing system. Furthermore, although a software implementation is described herein, a hardware implementation (such as on an ASIC) may also be used.

Token Toolbar in a Web Browser

Some embodiments include a method of submitting information as part of an authentication operation. Specific exemplary embodiments describe a one time password (OTP) generated and displayed as part of a display field (such as a web browser window), although identity information other than OTPs may also be used. In these embodiments, the OTP display and the browser work in conjunction to submit the OTP to an entity requesting the OTP, such as a website. Although the exemplary embodiments herein are concerned primarily with OTP transfer to a website, the OTP display and browser may cooperate to submit the OTP to entities other than a website.

In operation, a user employs the browser to access a website. The website requires a credential (in this example an OTP) from the user to permit the user to access the website. Although many examples described herein use an OTP as a particular type of credential, it should be understood that any type of credential or other identifying information may be used in the concepts described herein.

In prior art systems, the user would need to provide the OTP to the website through the browser by manually entering the OTP into a particular field in the browser. Typically, the user reads the OTP from a separate device and enters the OTP into the appropriate browser field. Some prior art systems allow the user to provide the OTP electronically through, for example, a USB port.

In one or more of the described embodiments, an OTP is generated and displayed as part of the browser user interface (UI). In these embodiments, the OTP is provided as a "browser control," which in general is an object presented in a window or dialog box. Examples of browser controls include push-buttons, scroll bars, radio buttons, toolbars and pull-down menus, among others. Browser controls can be implemented with various techniques known in the art, for example by ActiveX controls and Java applets, among others.

In one embodiment, the OTP display is provided within a toolbar associated with the browser. From the point of view of the user, the displayed OTP appears to be part of the browser. The displayed OTP is then transferred to the appropriate field in the browser main web page area for submission to the website for which the user desires access. Thus, the toolbar and the browser work in conjunction to submit the OTP to the requesting website.

In some embodiments, the OTP does not transfer to the appropriate browser field until the user initiates the transfer in some way. For example, the user may activate an "autofill" button instantiated on the browser to initiate the OTP transfer. In other embodiments, the transfer is automatic, i.e., not requiring any action from the user to initiate the transfer.

FIG. 1 illustrates one embodiment of an OTP in a browser toolbar. This embodiment includes a browser 100 having an address toolbar 102 with an address field 108, a token toolbar 104 and a main web page area 106. The token toolbar 104 includes a token icon 109, token display field 110 and an autofill button 112.

Figure 2:
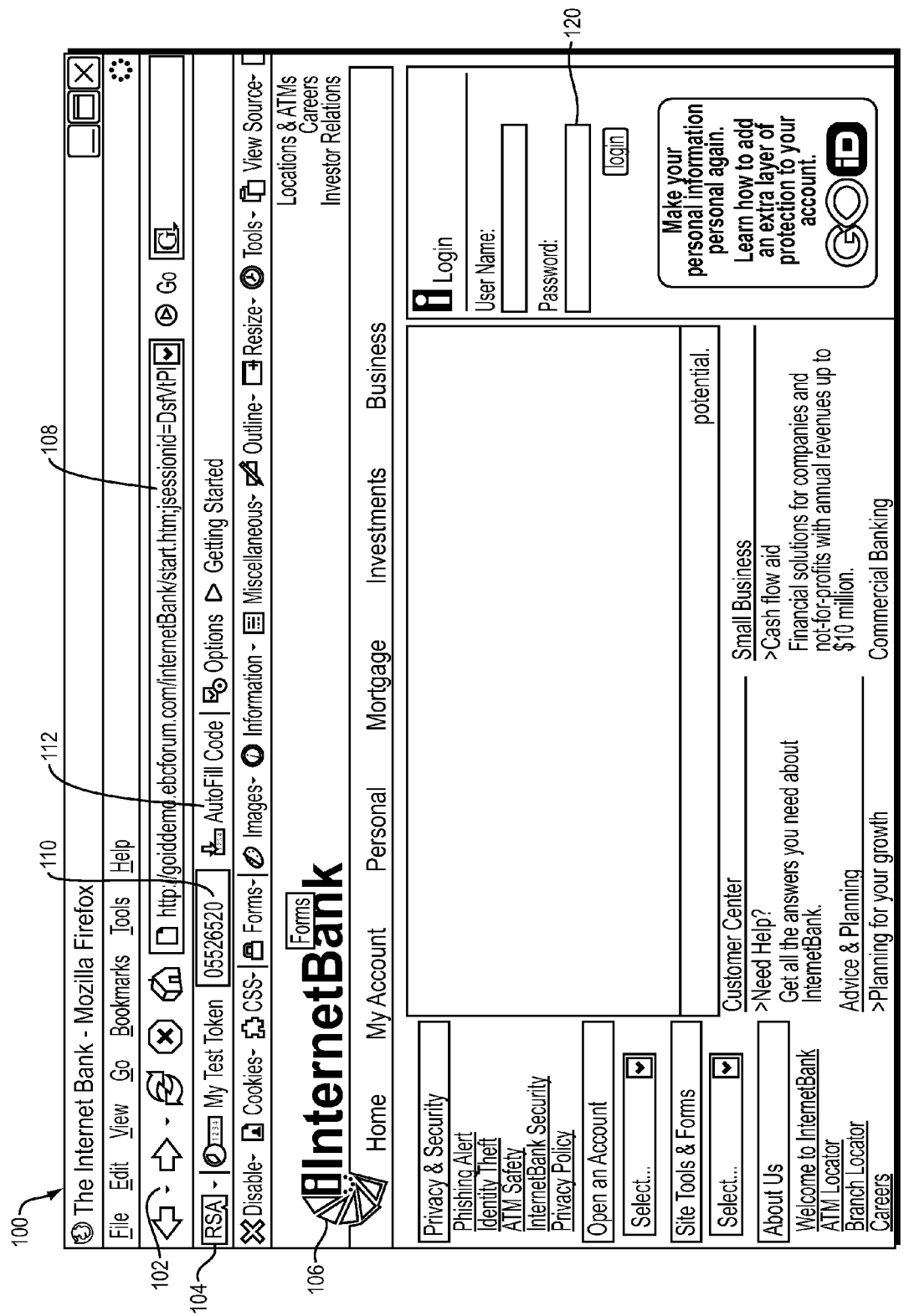
FIG. 2 shows a screen shot of another embodiment of an OTP in a browser tool bar shown in FIG. 1.

FIG. 2 shows a screen shot of another embodiment of an OTP in a browser tool bar shown in FIG. 1. This embodiment also includes a browser 100 having an address toolbar 102 with an address field 108, a token toolbar 104 and a main web page area 106. The token toolbar includes a token display field 110 and an autofill button 112. This embodiment also includes a password field 120 within the browser's main web page area 106 into which the OTP should be entered, as described above.

The OTP described herein can change based on a number of different factors. In some embodiments, the OTP changes as a function of time, for example once per minute. In other embodiments, the OTP changes as a function of an event sequence, for example each time the user activates a button or switch. In other embodiments, the OTP changes based on a challenge/response protocol, for example where the OTP is based on information carried in a challenge from the entity requesting the OTP.

The OTP described herein may be generated by combining a number of different components. For example, in one embodiment the OTP is simply the code generated by a seed based code generator (i.e., a token code). In other embodiments, the OTP is a combination of a personal identification number (PIN) and a token code. In general the OTP may consist of a token code, a PIN, a biometric (e.g., a fingerprint swipe or a retinal scan, among others), a password, or other such factors, or any combinations thereof.

Conditional Submission of Identity Information

Some embodiments include a method of controlling submission of identity information within an authentication system. These embodiments utilize one or more "trust lists" that are provided by the authentication system. Each trust list identifies entities that are authorized to receive the user's identity information. Thus, a trust list is generally associated with particular identity information. The authentication system designates which entities have such authorization, and uses the trust list to document those designations.

In at least one embodiment, a server component of the authentication system designates which entities are authorized to receive identity information, and generates the trust lists. In other embodiments. Alternative components of the authentication system may be used for this purpose.

When an entity (such as a website) requests a user's identity information (for example, an OTP), the described embodiments consult the trust list to provide the OTP to the requesting website only if that website is on the trust list. Thus, according to the described embodiments, a requesting website will only receive the user's identity information if the authentication system has designated the website as authorized to receive the identity information. In one embodiment, a processor within the user's system compares the website requesting the identity information to the trust list and only provide the identity information if the requesting website is one of the entities on the trust list.

In at least one embodiment, the information represented by the trust lists change over time as the authorization with respect to various entities change. For example, if a particular entity (such as a website) that was at one time trusted is known to be dealing in less than reputable practices, the authentication system may determine that the website should not be on the trust list. In these embodiments, the authentication system updates the trust list at predetermined intervals (e.g., once per hour, once per day, once per week, etc.).

Alternatively, the trust list may updated based on some version check with the authentication system. For example, if the trust list file has associated version information, the authentication system can evaluate the version of the trust list to determine whether it is the most recent version (i.e., whether the trust list is up to date). If the trust list is not the most recent version, the authentication system in one embodiment uses that information as a trigger to update the trust list file.

Although many of the exemplary embodiments are concerned with preventing a user from submitting identification information to an unauthorized website, the concepts described herein may be used to control submission of such information to a variety of destinations. For example, in one embodiment the entities that may or may not be authorized to receive the identity information include applications available to the user on the user's desktop (i.e., the user's local computing environment).

FIG. 1 shows graphically in the web page area 106 how the underlying code implements a software token library 114 to associate a database of token records 116 with a site trust list file 118.

Figure 3A:
FIGS. 3A and 3B illustrate of how OTP token information and associated trusted sites are coordinated in at least one embodiment.
Figure 3B:
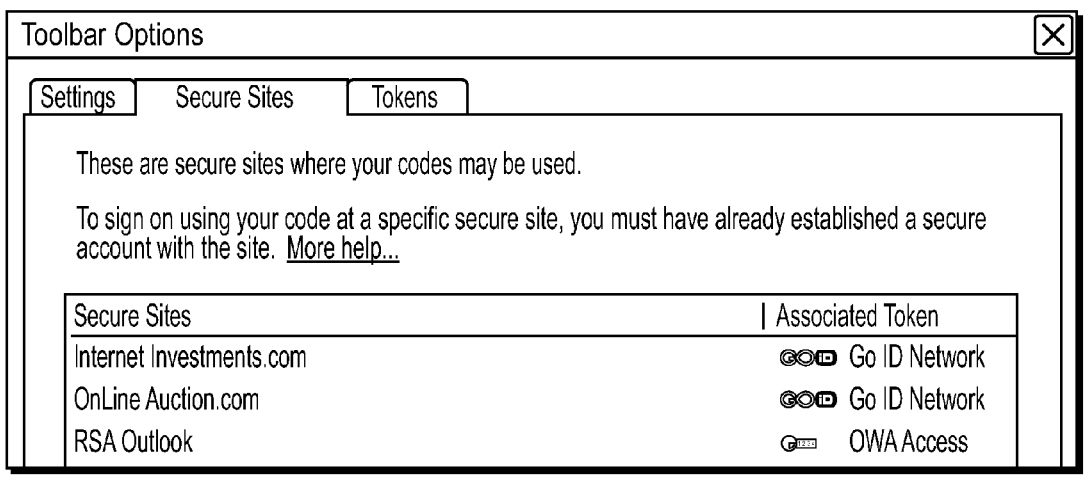

FIGS. 3A and 3B illustrate of how OTP token information and associated trusted sites are coordinated in at least one embodiment. For these specific examples, the secure websites are displayed along with their associated tokens so a user knows where the token or tokens may be used. Although these figures relate to trust lists that associate one or more URLs with a secure site, some embodiments may use other ways to identify secure sites. For example, a trust list may use a hash of a public key to identify the secure site. Or, a trust list may use an application name list, serial numbers or other identifying information to identify the user's authorized desktop applications. In general, the trust list may contain any identifying information used to identify entities that are authorized to receive the user's identifying information, such as OTP.

FIGS. 4A through 4F show various states of the token toolbar 104 of FIGS. 1 and 2. FIG. 4A shows the state of the token toolbar 104 when no tokens are installed. The token icon 113 is in the "no code" state, the token text indicates "no tokens installed," the autofill button 112 is disabled, and the token display field 110 is hidden.

FIG. 4B shows the state of the token toolbar 104 when one token is installed, but the current browser page is not a trusted website. The token icon 113 is in the "no code" state, the token text indicates "no code" because the current page is not from a trusted site, the autofill button 112 is disabled, and the token display field 110 is hidden.

FIG. 4C shows the state of the token toolbar 104 when one token is installed, and the current browser page is a trusted website. The token icon 113 is in the "countdown" state for a time-based OTP, which displays the remaining time until the code changes, the token text indicates "Go ID Network," indicating the token associated with the trusted website corresponding to the current page. The autofill button 112 is enabled, and the token display field 110 is shown, displaying the current OTP code.

FIG. 4D shows the state of the token toolbar 104 when more than one token is installed, and the current browser page is not a trusted website. The token icon 113 is in the "no code" state, the token text indicates "no code" because the current page is not from a trusted site, the autofill button 112 is disabled, and the token display field 110 is hidden.

FIG. 4E shows the state of the token toolbar 104 when more than one token is installed, and the current browser page is a trusted website associated with one of the tokens. The token icon 113 is in the "countdown" state for a time-based OTP, which displays the remaining time until the code changes, the token text indicates "Go ID Network," indicating the token associated with the trusted website corresponding to the current page. The autofill button 112 is enabled, and the token display field 110 is shown, displaying the current OTP code.

FIG. 4F shows the state of the token toolbar 104 when more than one token is installed, and the current browser page is a trusted website associated with a different token than the one shown in FIG. 4E. The token icon 113 is in the "countdown" state for a time-based OTP, which displays the remaining time until the code changes, the token text indicates "OWA access," indicating the token associated with the trusted website corresponding to the current page. The autofill button 112 is enabled, and the token display field 110 is shown, displaying the current OTP code.

One embodiment combines both the token toolbar in a web browser with the conditional submission of identity information as described above. This embodiment generates and displays an OTP as part of the browser interface in, for example, a toolbar. The Browser and toolbar cooperate to submit the OTP to the requesting website. The embodiment also utilizes one or more "trust lists" that identify entities authorized to receive the user's identity information. When a website requests an OTP, this embodiment consults the trust list and provides the OTP to the requesting website only if that website is on the trust list.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of submitting information as part of an authentication operation, comprising:
   generating a one time password that is intended for use in an authentication operation;
   providing the one time password in a display field, wherein the display field is adapted to work in conjunction with a browser to submit the one time password in response to a request for the one time password; and,
   containing the display field in a browser control,
   wherein the browser includes a browser window and instructions, the browser window including, as the browser control, a toolbar area, the instructions being constructed and arranged to run on a processor;
   wherein providing the one time password in the display field, wherein the display field is adapted to work in conjunction with the browser to submit the one time password in response to the request for the one time password, includes:
      sending, by the processor, the one time password to a destination node from which the request for the one time password originated; and
   wherein containing the display field in the browser control includes:
      rendering a view of the display field in the toolbar area of the browser window.

2. The method of claim 1, further including submitting the one time password in response to the request without user intervention.

3. The method of claim 1, further including submitting the one time password in response to the request only if a user provides authorization to submit the one time password.

4. The method of claim 1, further including combining a token code and a PIN to generate the one time password.

5. The method of claim 1, further including combining a token code and a biometric to generate the one time password.

6. The method of claim 1, further including combining a token code, a biometric and a PIN to generate the one time password.

7. The method of claim 1, wherein the browser control is an applet.

8. The method of claim 1, wherein the browser control is an ActiveX control.

9. The method of claim 1, further including generating the one time password to vary as a function of time.

10. The method of claim 1, further including generating the one time password to vary as a function of a sequence of events.

11. The method of claim 1, further including:
    receiving a challenge; and,
    generating the one time password as a function of at least a portion of the challenge.

12. The method of claim 1, further including preventing the display field and the browser from submitting the one time password if a trust list indicates that the one time password should not be submitted.

13. The method of claim 1, wherein generating the one time password includes outputting, by a processor, the one time password; and
    wherein providing the one time password in the display field includes rendering, by a display device, the one time password in the display field to be viewed by a user.

14. An apparatus for submitting information as part of an authentication operation, comprising:
    a password generator for generating a one time password that is intended for use in an authentication operation; and,
    a display generator for providing the one time password in a display field, wherein the display field is adapted to work in conjunction with a browser to submit the one time password in response to a request for the one time password;
    wherein the display field is contained in a browser control,
    wherein the browser includes a browser window and instructions, the browser window including, as the browser control, a toolbar area, the instructions being constructed and arranged to run on a processor;
    wherein providing the one time password in the display field, wherein the display field is adapted to work in conjunction with the browser to submit the one time password in response to the request for the one time password, includes:

sending, by the processor, the one time password to a destination node from which the request for the one time password originated; and wherein containing the display field in the browser control includes:

rendering a view of the display field in the toolbar area of the browser window.

15. The apparatus of claim 14, wherein the one time password is submitted in response to the request without user intervention.

16. The apparatus of claim 14, wherein the one time password is submitted in response to the request only if a user provides authorization to submit the one time password.

17. The apparatus of claim 14, wherein the one time password is generated by combining a token code and a PIN.

18. The apparatus of claim 14, wherein the one time password is generated by combining a token code and a biometric.

19. The apparatus of claim 14, wherein the one time password is generated by combining a token code, a biometric and a PIN.

20. The apparatus of claim 14, wherein the browser control is an applet.

21. The apparatus of claim 14, wherein the browser control is an ActiveX control.

22. The apparatus of claim 14, wherein the one time password varies as a function of time.

23. The apparatus of claim 14, wherein the one time password varies as a function of a sequence of events.

24. The apparatus of claim 14, wherein the one time password is generated as a function of at least a portion of a received challenge.

25. The apparatus of claim 14, wherein the display generator and the browser do not submit the one time password if a trust list indicates that the one time password should not be submitted.

26. A method of controlling submission of identity information within an authentication system, comprising:

receiving, by a processor, a trust list from the authentication system, wherein the trust list identifies entities that are authorized to receive the identity information;

receiving, by the processor, a request to submit the identity information to a candidate entity for an authentication operation;

providing, by the processor, the identity information to the candidate entity if the trust list indicates that the candidate entity is authorized to receive the identity information;

providing a display field for displaying the identity information; and, containing the display field in a browser control, wherein the display field is adapted to work in conjunction with a browser to submit identity information in response to a request for the identity information, the browser including a browser window and instructions, the browser window including, as the browser control, a toolbar area, the instructions being constructed and arranged to run on a processor;

wherein providing the one time password in the display field, wherein the display field is adapted to work in conjunction with the browser to submit the one time password in response to the request for the one time password, includes:

sending, by the processor, the one time password to a destination node from which the request for the one time password originated; and wherein containing the display field in the browser control includes:

rendering a view of the display field in the toolbar area of the browser window.

27. The method of claim 26, further including providing credentials as the identity information.

28. The method of claim 26, further including providing a one time password as the identity information.

29. The method of claim 28, further including generating the one time password as a combination of a PIN and a token code.

30. The method of claim 28, further including combining a token code and a biometric to generate the one time password.

31. The method of claim 28, further including combining a token code, a biometric and a PIN to generate the one time password.

32. The method of claim 28, further including generating the one time password to vary as a function of time.

33. The method of claim 28, further including generating the one time password to vary as a function of a sequence of events.

34. The method of claim 28, further including:

receiving a challenge; and, generating the one time password as a function of at least a portion of the challenge.

35. The method of claim 26, further including providing a password as the identity information.

36. The method of claim 26, further including the trust list identifying websites as entities that are authorized to receive the identity information.

37. The method of claim 26, further including the trust list identifying desktop applications as entities that are authorized to receive the identity information.

38. The method of claim 26, wherein receiving the trust list from the authentication system further includes communicating with a server of the authentication system.

39. The method of claim 26, further including displaying a blank field in the display field if the trust list indicates that the candidate entity is not authorized to receive the identity information.

40. The method of claim 26, further including displaying a diagnostic message in the display field if the trust list indicates that the candidate entity is not authorized to receive the identity information.

41. The method of claim 26, wherein the browser control is an applet.

42. The method of claim 26, wherein the browser control is an ActiveX control.

43. An apparatus for controlling submission of identity information within an authentication system, comprising:

a receiver for (i) receiving a trust list from the authentication system, wherein the trust list identifies entities that are authorized to receive the identity information, and (ii) receiving a request to submit the identity information to a candidate entity for an authentication operation; and, a processor for:

providing the identity information to the candidate entity if the trust list indicates that the candidate entity is authorized to receive the identity information, providing a display field for displaying the identity information, and containing the display field in a browser control, wherein the display field is adapted to work in conjunction with a browser to submit identity information in response to a request for the identity information, the browser including a browser window and instructions, the browser window including, as the browser control, a toolbar area, the instructions being constructed and arranged to run on a processor;

wherein providing the one time password in the display field, wherein the display field is adapted to work in conjunction with the browser to submit the one time password in response to the request for the one time password, includes:

sending, by the processor, the one time password to a destination node from which the request for the one time password originated; and wherein containing the display field in the browser control includes:

rendering a view of the display field in the toolbar area of the browser window.

44. The apparatus of claim 43, further including providing credentials as the identity information.

45. The apparatus of claim 43, further including providing a one time password as the identity information.

46. The apparatus of claim 45, further including generating the one time password as a combination of a PIN and a token code.

47. The apparatus of claim 45, wherein the one time password is generated by combining a token code and a biometric.

48. The apparatus of claim 45, wherein the one time password is generated by combining a token code, a biometric and a PIN.

49. The apparatus of claim 45, further including generating the one time password to vary as a function of time.

50. The apparatus of claim 45, further including generating the one time password to vary as a function of a sequence of events.

51. The apparatus of claim 45, further including:
receiving a challenge; and,
generating the one time password as a function of at least a portion of the Challenge.

52. The apparatus of claim 43, further including providing a password as the identity information.

53. The apparatus of claim 43, further including the trust list identifying websites as entities that are authorized to receive the identity information.

54. The apparatus of claim 43, further including the trust list identifying desktop applications as entities that are authorized to receive the identity information.

55. The apparatus of claim 43, wherein receiving the trust list from the authentication system further includes communicating with a server of the authentication system.

56. The apparatus of claim 43, further including displaying a blank field in the display field if the trust list indicates that the candidate entity is not authorized to receive the identity information.

57. The apparatus of claim 43, further including displaying a diagnostic message in the display field if the trust list indicates that the candidate entity is not authorized to receive the identity information.

58. The apparatus of claim 43, wherein the browser control is an applet.

59. The apparatus of claim 43, wherein the browser control is an ActiveX control.

60. A method of providing and controlling submission of information within an authentication system, comprising:

generating, by a processor a one time password that is intended for use in an authentication operation;

providing, by the processor, the one time password in a display field, wherein the display field is adapted to work in conjunction with a browser to submit the one time password in response to a request for the one time password;

containing the display field in a browser control;

receiving, by the processor, a trust list from the authentication system, wherein the trust list identifies entities that are authorized to receive the one time password;

receiving, by the processor, a request to submit the one time password to a candidate entity for the authentication operation; and, providing, by the processor, the one time password to the candidate entity if the trust list indicates that the candidate entity is authorized to receive the one time password, wherein the browser includes a browser window and instructions, the browser window including, as the browser control, a toolbar area, the instructions being constructed and arranged to run on a processor;

wherein providing the one time password in the display field, wherein the display field is adapted to work in conjunction with the browser to submit the one time password in response to the request for the one time password, includes:

sending, by the processor, the one time password to a destination node from which the request for the one time password originated; and wherein containing the display field in the browser control includes:

rendering a view of the display field in the toolbar area of the browser window.

61. The method of claim 60, wherein the browser window further includes a main web page area which has an input field;

wherein the method further comprises:
transferring the one time password displayed in the display field to the input field of the main web page area;

wherein receiving the trust list from the authentication system includes:

obtaining a hash of a public key associated with the candidate entity, the hash of the public key being constructed and arranged to identify the candidate entity;

wherein providing the one time password to the candidate entity if the trust list indicates that the candidate entity is authorized to receive the one time password includes:

displaying, in the browser control, a token text string which indicates an amount of time remaining in which the one time password is valid; and wherein the method further includes:
withholding the one time password from the candidate entity if the trust list indicates that the candidate entity is not authorized to receive the one time password.

* * * * *